(No Model.)

G. R. PEARE.
WAGON LOCK.

No. 292,175. Patented Jan. 22, 1884.

Witnesses
E. A. Dick
Walter Blandford

Inventor
George R. Peare
By Marcellus Bailey
his Attorney

UNITED STATES PATENT OFFICE.

GEORGE R. PEARE, OF LYNN, MASSACHUSETTS.

WAGON-LOCK.

SPECIFICATION forming part of Letters Patent No. 292,175, dated January 22, 1884.

Application filed June 9, 1883. (No model.)

*To all whom it may concern:*

Be it known that I, GEORGE R. PEARE, of Lynn, in the State of Massachusetts, have invented certain new and useful Improvements in Brakes and Locking Mechanism for Wheeled Vehicles, of which the following is a specification.

It is my object to devise such an arrangement that the wheels of the vehicle shall be braked or locked automatically when the occupant quits the vehicle, and shall be automatically released when the occupant gets into the vehicle. To this end I connect the wheel or lock, or both, to the step upon which the foot of the occupant rests in getting into and out of the vehicle, and I make this step movable, and so construct it that when the occupant is getting out of the vehicle it will be moved in a direction to brake or lock the wheels, and on the other hand, when the occupant is getting into the vehicle, said step will be moved in the opposite direction, so as to release the wheels. To this end I make use of a double step—preferably arranged to oscillate—one part of which is last quitted by the foot when getting into the vehicle, with the effect of releasing the wheels, and the other part of which is last quitted by the foot when getting out of the vehicle, with the effect of braking or locking the wheels. The locking or braking and releasing of the wheels is thus, in a manner, automatically effected without the exercise of volition or thought on the part of the occupant of the vehicle. This arrangement will be found to possess advantages in many cases, and is particularly adapted for use on business-wagons, such as used by butchers, bakers, expressmen, and the like.

The nature of my invention and the manner in which the same is or may be carried into practical effect will be readily understood by reference to the accompanying drawings, in which—

Figure 1:
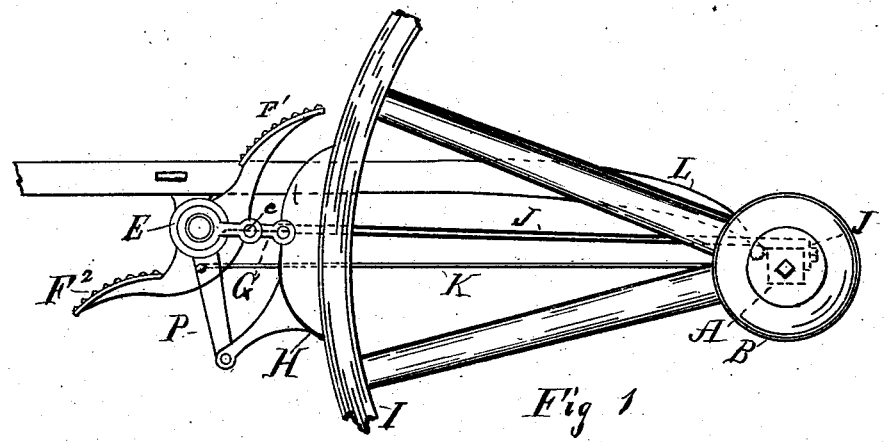
Figure 2:
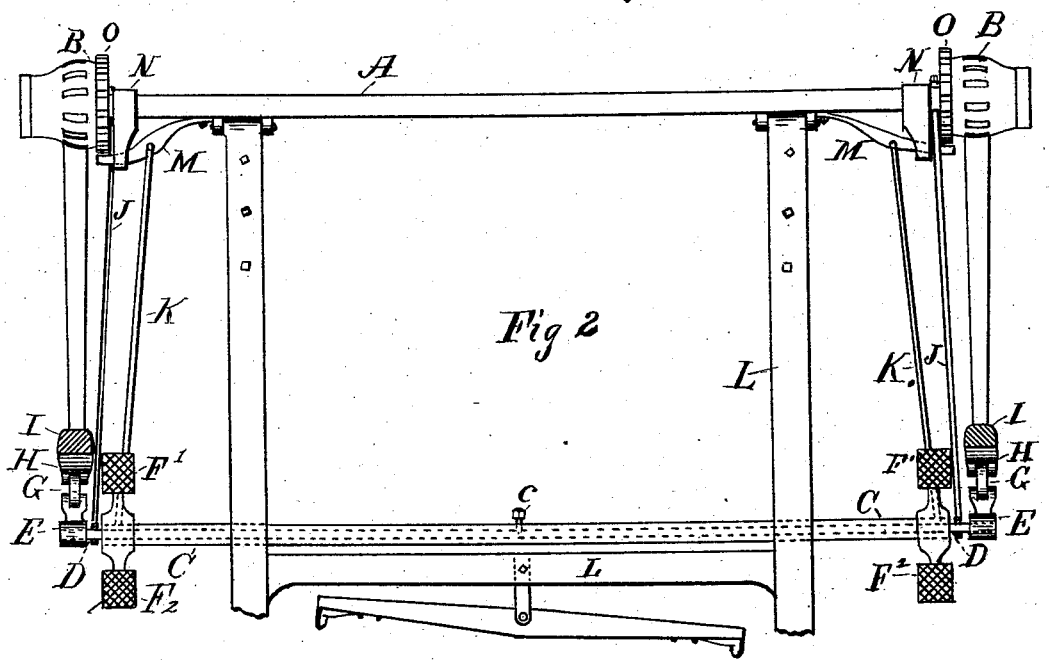

Figure 1 is a side elevation of so much of a wheeled vehicle as needed for the purpose of explanation. Fig. 2 is a plan of the same.

A is the axle-tree, on which are mounted the wheels to be acted on by the braking or locking mechanism, or both. The hubs of these wheels are shown at B and their tires or rims at I. The shafts of the vehicle are marked L. Extending crosswise or transversely of the vehicle is the sleeve or hollow rod C, mounted in bearings on the under side of the shafts L, so that it can rock or turn in said bearings. Upon each end of the sleeve is made fast a double step, $F'$ $F^2$, such as hereinbefore referred to. In getting into the vehicle, the foot is placed first upon $F^2$ and then upon $F'$, with the effect of depressing $F'$ and of rotating or rocking sleeve C in a corresponding direction. In getting out of the vehicle, the operation is reversed, the foot being placed first upon $F'$ and then upon $F^2$, with the effect of depressing the latter and of rotating or rocking the sleeve C in that direction. The extent of rotary movement of the sleeve in either direction is limited by any suitable stop, and a spring may, if desired, be combined with the double step, so as to hold it in either position to which it may be tilted. To each double step is secured a connecting-rod, K, which at the other end is jointed to a latch, M, movable in a guide, N, to and from a notched disk integral with or fast to the wheel-hub B. When the foot is last placed on $F^2$, the latch is moved in a direction to engage the notched disk O, and thus lock the wheel. When, on the other hand, $F'$ is depressed, the latch is drawn out of engagement with the notched disk, and the wheel is released. The devices just described constitute the wheel locking and releasing mechanism.

The mechanism for applying and releasing the brake will now be described.

When a brake is used, it is desirable that both wheels shall receive an equal pressure from the brake-shoes, which would not be the case were said shoes attached directly to sleeve C, for the reason that the brake-shoe on the side where the foot is applied receives a direct force, while that on the opposite side of the vehicle has the power transmitted to it through the shaft or sleeve, which is liable to twist from torsional strain, consequently exerting less pressure on the wheel on that side. To obviate this difficulty, a variety of mechanical devices may be resorted to. One simple device for the purpose is to employ a rod, D, which is inserted in and extends through the sleeve C, and is attached thereto at the center or midway of its length by a bolt, set-screw, clamp, or other fastening device, c. When the sleeve C is turned, its movement is transmitted at the central point, c, to the inner rod, D, and consequently the power will be applied by the latter equally at each of its ends. The ends of the rods D which project beyond the sleeve are connected by stay-rods J to the axle A, so as to prevent the rod from springing or yielding when the brake is applied.

To each end of the rod D is made fast one arm, E, of a toggle, the other arm, G, of which is jointed to a brake-shoe, arranged to work against the tire of the wheel on that side of the vehicle. When the pedal or step F' is depressed, the elbow or knuckle e of the toggle is depressed, and the pressure of the brake-shoe is consequently removed from the wheel. When, on the contrary, the pedal $F^2$ is depressed, (and this is the position of the parts shown in Fig. 1,) the toggle is straightened, with the effect of causing the brake-shoe to press powerfully upon the tire of the wheel.

In order to hold and steady the shoe during its movements, I employ an auxiliary arm, P, fast to and projecting downwardly from the hub of the part E of the toggle, which is jointed to an arm fast to and projecting downwardly from the brake-shoe H.

The mode of operation of the parts has been sufficiently indicated in the foregoing description and does not require further explanation. It is manifest, as hereinbefore stated, that either the lock or the brake can be used without the other; and I do not therefore restrict myself to the use of both in conjunction; nor do I restrict myself to the special mechanical details herein shown and described, for the same may be widely varied by the competent mechanic without departure from my invention, the characteristic feature of which resides in the automatic locking or braking and releasing of the wheels of the vehicle, through the instrumentality of a double step or its equivalent, used by the occupant on the vehicle in getting into and out from the same.

What, therefore, I claim as new and of my invention is as follows:

1. The combination, with the vehicle-wheels and a brake or lock therefor, of a movable double step actuated to move in one direction by the foot of the occupant on leaving the vehicle, and in the other direction by the foot of the occupant on getting into the vehicle, and mechanism connecting said double step with the brake or lock, whereby the latter is caused to engage or release the wheels, according to the direction in which the double step is moved, substantially as and for the purposes hereinbefore set forth.

2. The vibratory double step F' $F^2$ and rocking shaft or sleeve on which the same is mounted, in combination with the vehicle-wheels, the brake or lock, and intermediate mechanism connecting said brake or lock with the double step, the combination being and acting substantially as hereinbefore set forth.

3. The vibratory double step, its rocking sleeve, and rod extending through said sleeve and centrally fixed thereto, in combination with the vehicle-wheels, the brake-shoes, and the system of toggles connecting the same with said step, under the arrangement and for joint operation substantially as hereinbefore set forth.

In testimony whereof I have hereunto set my hand this 8th day of June, 1883.

GEO. R. PEARE.

Witnesses:
THOS. H. ROUAYNE,
N. M. HAWKES.